(12) United States Patent
Devlin

(10) Patent No.: US 7,594,673 B1
(45) Date of Patent: Sep. 29, 2009

(54) BUMPER HITCH WOBBLE REDUCTION DEVICE

(76) Inventor: Gary W. Devlin, 807 Koehler Ave., Sherwood, AR (US) 72120

( * ) Notice: Subject to any disclaimer, the term of this patent is extended or adjusted under 35 U.S.C. 154(b) by 308 days.

(21) Appl. No.: 11/673,181

(22) Filed: Feb. 9, 2007

(51) Int. Cl.
*B60D 1/04* (2006.01)
(52) U.S. Cl. .................. 280/506; 280/304.3; 280/304.4
(58) Field of Classification Search .............. 280/506, 280/304.3, 304.4
See application file for complete search history.

(56) References Cited

U.S. PATENT DOCUMENTS

| | | | | |
|---|---|---|---|---|
| 4,226,347 A | * | 10/1980 | Rice | 224/418 |
| 5,397,146 A | * | 3/1995 | Fischer | 280/288.4 |
| 5,871,269 A | * | 2/1999 | Chien | 362/474 |
| 6,382,656 B1 | * | 5/2002 | Johnson, Jr. | 280/506 |
| 6,834,879 B1 | * | 12/2004 | Lorman | 280/506 |
| 7,059,158 B2 | * | 6/2006 | Freeman | 70/34 |

* cited by examiner

*Primary Examiner*—Lesley D Morris
*Assistant Examiner*—Michael R Stabley
(74) *Attorney, Agent, or Firm*—Joe D. Calhoun

(57) ABSTRACT

A collar or sleeve configured to lie snugly adjacent the cavity formed by the inner wall of a bumper hitch receiver, and including a longitudinal gap allowing the sleeve to resiliently flex inwardly to facilitate insertion of the sleeve within the receiver, to assure contact with the inner wall of the receiver. The device may also include a flange or lip outstanding from the trailing edge of the sleeve, to prevent insertion within the receiver too far to allow easy extraction when no longer needed; a finger curl may also extend rearward from the sleeve, to facilitate extraction of the sleeve from the bumper hitch receiver.

7 Claims, 4 Drawing Sheets

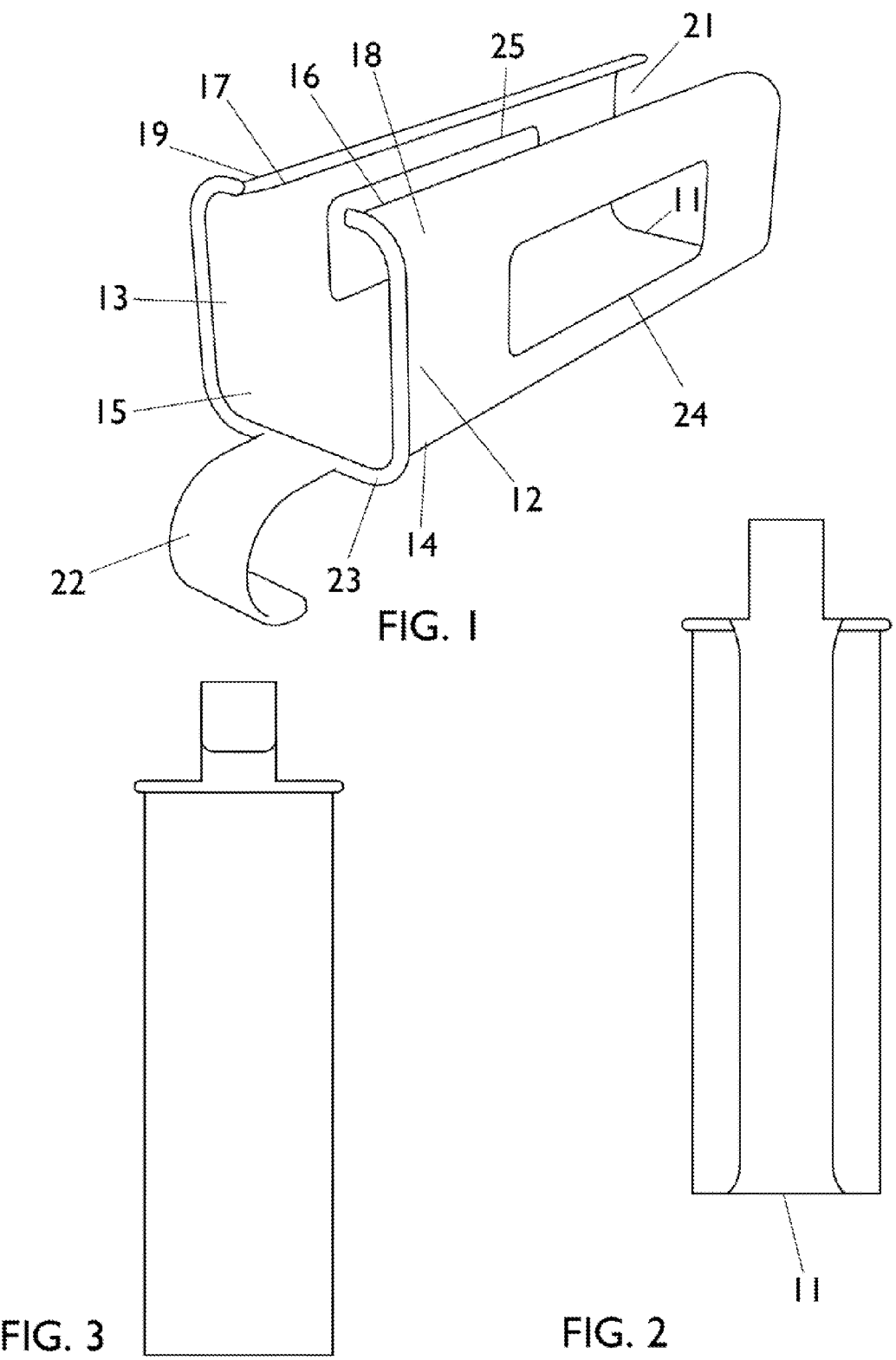

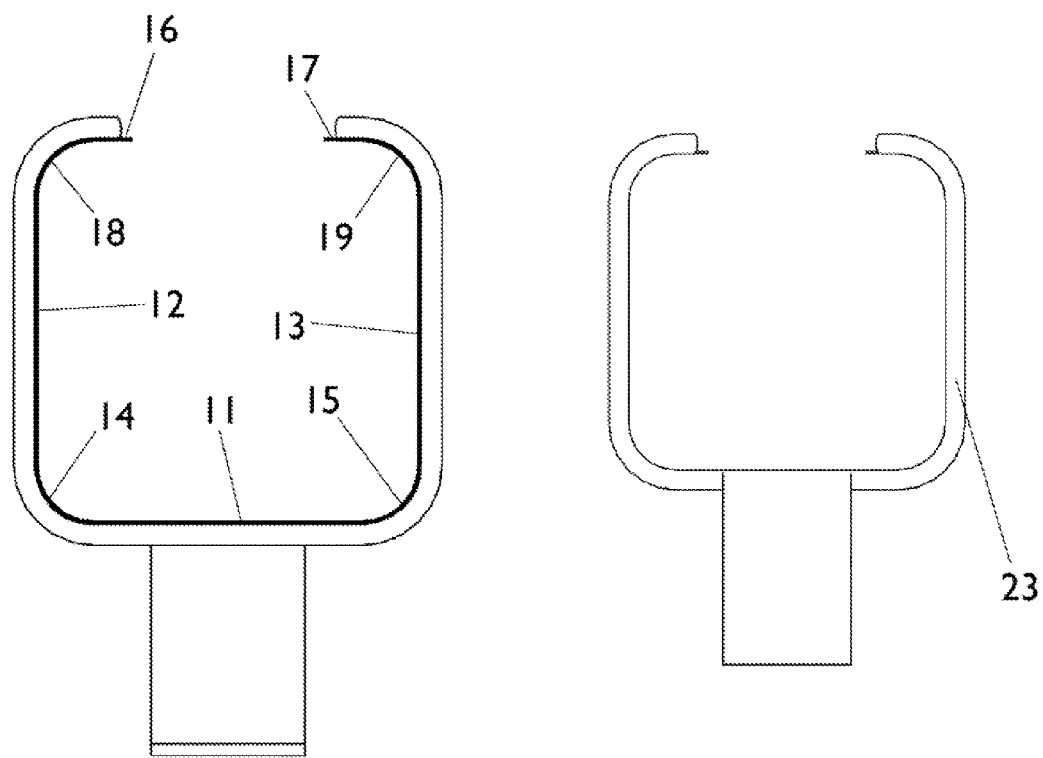
FIG. 4
FIG. 5
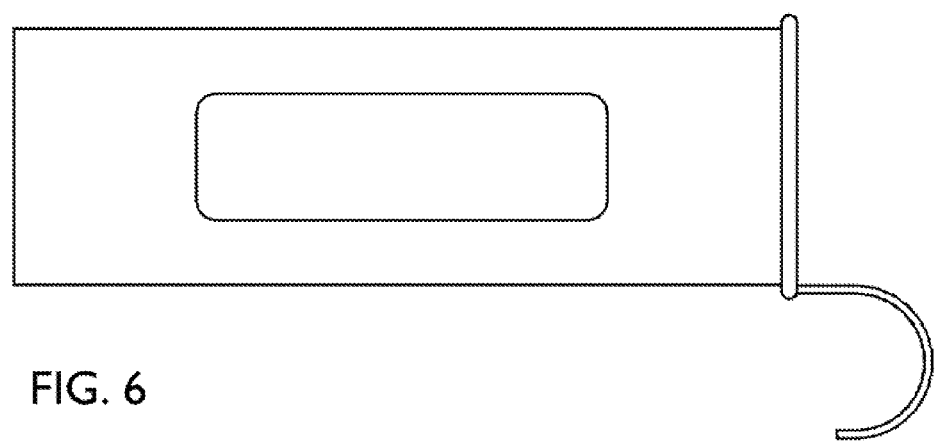
FIG. 6

BUMPER HITCH WOBBLE REDUCTION DEVICE

CROSS REFERENCE TO RELATED APPLICATIONS

Not applicable.

FEDERALLY SPONSORED RESEARCH AND DEVELOPMENT

Not applicable.

MICROFICHE APPENDIX

Not applicable.

BACKGROUND OF THE INVENTION (1) Field of the Invention

This invention generally relates to devices that reduce or eliminate the wobble of a bumper hitch insert inserted into a bumper hitch receiver. More specifically, this invention relates to shims and wedging devices that reduce the spacing between the inner surface of the receiver and the outer surface of the insert inserted into the receiver cavity. It includes a collar or sleeve configured to lie snugly adjacent the cavity formed by the inner wall of a bumper hitch receiver, and it includes a longitudinal gap allowing the sleeve to resiliently flex inwardly to facilitate insertion of the sleeve within the receiver, to assure contact with the inner wall of the receiver. The device may also include a flange or lip outstanding from the trailing edge of the sleeve, to prevent insertion within the receiver too far to allow easy extraction when no longer needed; a finger curl may also extend rearward from the sleeve, to facilitate extraction of the sleeve from the bumper hitch receiver.

Many vehicles today are equipped with receiver-type trailer hitches. Typically, these types of trailer hitches include a square receiver tube, normally 1½ or 2 inches in internal height and width, attached to the undercarriage of the vehicle. A second insert shank, which acts as a shank, includes outer dimensions slightly smaller than the internal dimensions of the receiver tube, so that it may be slideable inserted within the receiver tube. Once inserted, it is connected to the receiver by a lockpin or similar fastener inserted through aligned holes in both to prevent relative movement therebetween.

The rearward end of the insert shank may include a standard hitch-ball for engaging with the cupped tongue or hitch of a trailer or other wheeled vehicle. Another popular use for receiver hitches is to substitute a coupling device for the hitch-ball, for mounting racks and other accessories onto the vehicle. Bicycle carrier racks, ski carriers, barbeque grills, transport platforms, storage boxes and other types of carriers have been designed to use the above-described hitch insert shank to engage within a hitch receiver tube. This provides a universal system that allows a vehicle user to be able to use various trailers and carriers with a single coupling system.

One particular problem with the use of these conventional hitch assemblies is the clearance between the internal dimensions of the receiver tube and the external dimensions of the insert shank. These tubes by necessity must have sufficient clearance therebetween so that the shank is efficiently and easily telescopingly received within the receiver tube. Some space is desirable between the walls of the receiver tube and the walls of the shank, to allow easy attachment and detachment of the hitch. This space permits ease of coupling and decoupling between the receive tube and the shank. However, the clearance between the two causes relative movement therebetween, which potentially results in an shank that rattles or wobbles within the receiver tube during use. This rattle or wobble is an annoyance, at best, at best; and, at worst, it can distract the driver or cause damage to the trailer or the accessory. Moreover, with barbeque grills, bicycle racks, transport platforms and storage boxes that essentially set atop a vertical pole attached to (or integral with) the shank, slight axial movement of the shank side-to-side within the receiver translates into substantial pendular movement of whatever accessory is set atop the vertical pole; such substantial movement may cause damage to the accessory or its contents. Given the increasing prevalence of bumper-hitch accessories, there is an increased need for a durable device such as the invention disclosed herein, that is easily installed and uninstalled, and that eliminates or reduces the wobble and rattle of bumper hitch accessories mounted on a vehicle.

(2) Description of Related Art Including Information Disclosed 37 CFR 1.97 and 1.98

Devices to reduce wobble or rattling of trailer hitch inserts within receivers have been available for several years. Known in the art are the following, arguably related to the patentability of the present invention:

| U.S. Pat. No. | 1st Inventor | Date of Patent/Publication |
|---|---|---|
| 5,333,888 | Ball | Aug. 2, 1994 |
| 5,988,667 | Young | Nov. 23, 1999 |
| 6,010,143 | Stein | Jan. 4, 2000 |
| 6,105,989 | Linger | Aug. 22, 2000 |
| 6,131,938 | Speer | Oct. 17, 2000 |
| 6,142,502 | Breslin | Nov. 7, 2000 |
| 6,382,656 | Johnson. Jr. | May 7, 2002 |
| 6,835,021 | McMillan | Dec. 28, 2004 |
| 6,974,147 | Kolda | Dec. 13, 2005 |
| 7,004,491 | Allsop | Feb. 28, 2006 |
| 7,077,417 | Shoemaker | Jul. 18, 2006 |

U.S. Pat. No 6,382,656 issued to Johnson discloses an anti-rattle device for a trailer hitch comprising one or more flexible shims that are slideably inserted between the bumper hitch shaft and the receiver. The shims are essentially small rectangular sheets of plastic, preferably high density polycarbonate plastic; they must have sufficient strength and elasticity to flex without cracking upon being subjected to compression, bending and twisting forces between the bumper hitch shaft and the receiver. This patent indicates that the hitch is only subject to up and down rattling motions, since the lockpin naturally supports the hitch and prevents side to side motion.

U.S. Pat. No. 7,004,491 issued to Allsop discloses a wedge tightening device for hitch assemblies, comprising a wedge plate for insertion between the bumper hitch receiver's inner wall and the outer wall of the bumper hitch shaft. The wedge plate is wide enough to extend the width of the bumper hitch shaft, and bend partly around the notched corner of the bumper hitch shaft. There are aligned holes through one wall of the receiver, wedge plate and shaft; there is also a threaded nut attached to the inner wall of the shaft, for accepting a bolt screwed through the receiver and the wedge plate to essentially draw all three members into close, not-rattling contact.

None of the cited patents disclose an insertion sleeve having a longitudinal gap and resilient flexibility in its non-longitudinal direction, allowing the outwardly biased sleeve to resiliently flex inwardly; nor does any of the cited patents disclose a flange or lip outstanding from the trailing edge of the sleeve to prevent completion insertion into the receiver, or a curl member outstanding rearward therefrom to ease insertion and removal of the sleeve.

BRIEF SUMMARY OF THE INVENTION

Although the invention has a number of features, its basic elements include a collar or sleeve configured to lie snugly adjacent the cavity formed by the inner wall of a bumper hitch receiver. The invention further includes a longitudinal gap (preferably along the upper wall) allowing the sleeve to resiliently flex inwardly to facilitate insertion of the sleeve within the receiver; the sleeve is flexibly biased outwardly, to assure contact with the inner wall of the receiver. The invention may also include a flange or lip outstanding from the sleeve (preferably from the bottom wall at the trailing edge of the sleeve), to prevent insertion within the receiver too far to allow easy extraction when no longer needed. Lastly, the invention also includes holes or slots aligned with the holes in the receptacle and insert, through which the lockpin may be thrust; the sleeve holes may be rather oblong, since their precise location is not essential so long as the lockpin may be run through.

One primary object of the present invention is to provide a wobble reduction device that is easy to insert, and remove after use.

Another primary object of the present invention is to provide a wobble reduction device that is portable and easy to operate.

It is another object of the present invention to provide a wobble reduction device that pins itself against the cavity of the receiver after insertion therein, before insertion of the insert.

Other objects will be apparent from a reading of the written description disclosed herein, together with the claims.

BRIEF DESCRIPTION OF THE SEVERAL VIEWS OF THE DRAWINGS

FIG. 1 depicts a perspective view of one embodiment of the invention.

FIG. 2 depicts a top plan view of the invention of FIG. 1.

FIG. 3 depicts a bottom plan view of the invention of FIG. 1.

FIG. 4 depicts a front elevation view of the invention of FIG. 1.

FIG. 5 depicts a rear elevation view of the invention of FIG. 1.

FIG. 6 depicts a left side elevation plan view of the invention of FIG. 1.

FIGS. 1 through 9 illustrate certain details of certain embodiments. However, the invention disclosed herein is not limited to only the embodiments so illustrated. The invention disclosed herein may have equally effective or legally equivalent embodiments.

DETAILED DESCRIPTION OF THE INVENTION

Figure 7:
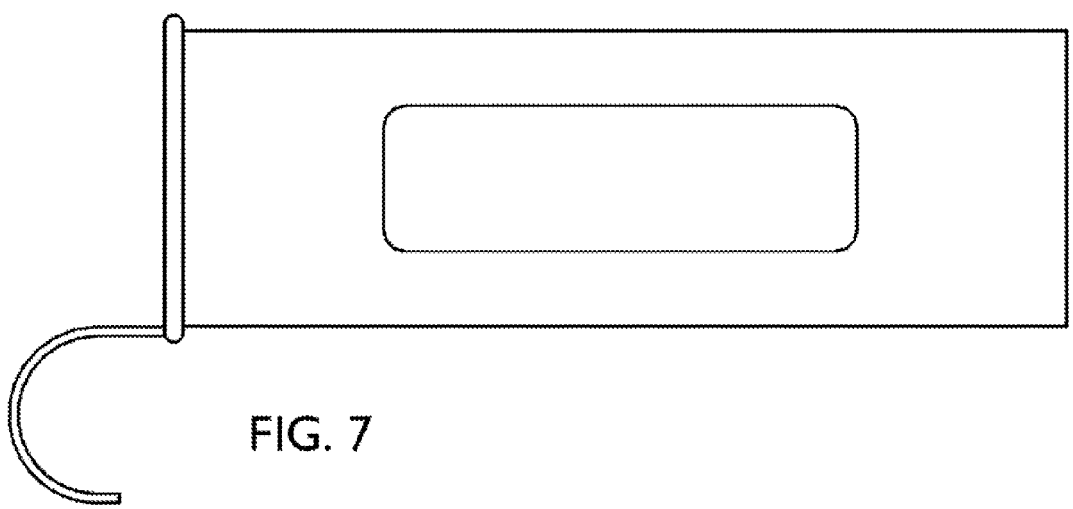
FIG. 7 depicts a right side elevation plan view of the invention of FIG. 1.
Figure 8:
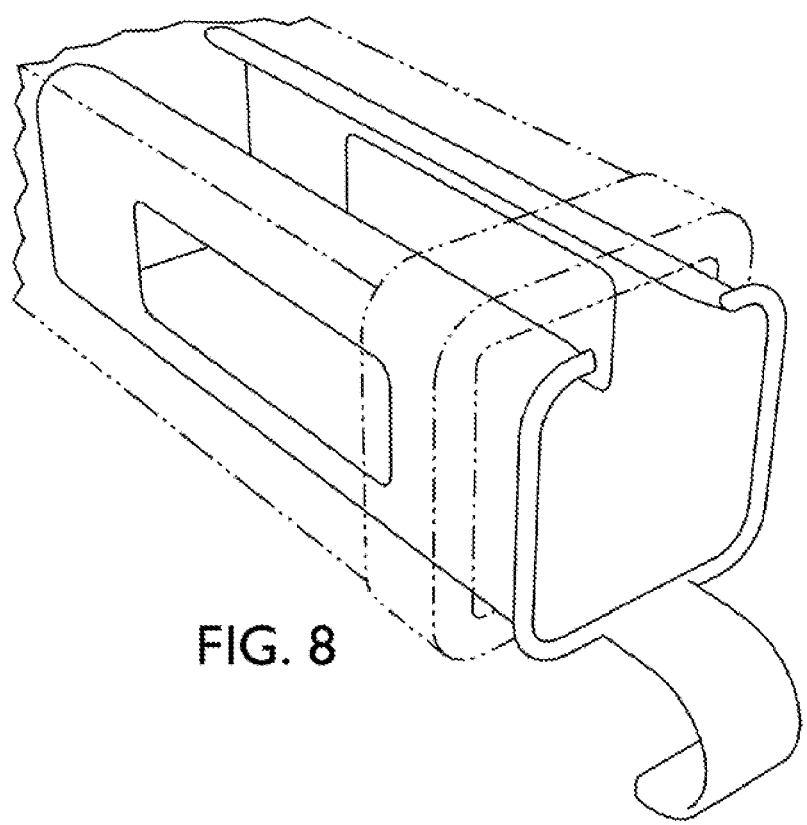
FIG. 8 depicts a representative bumper hitch receiver in phantom, with the invention of FIG. 1 inserted within.
Figure 9:
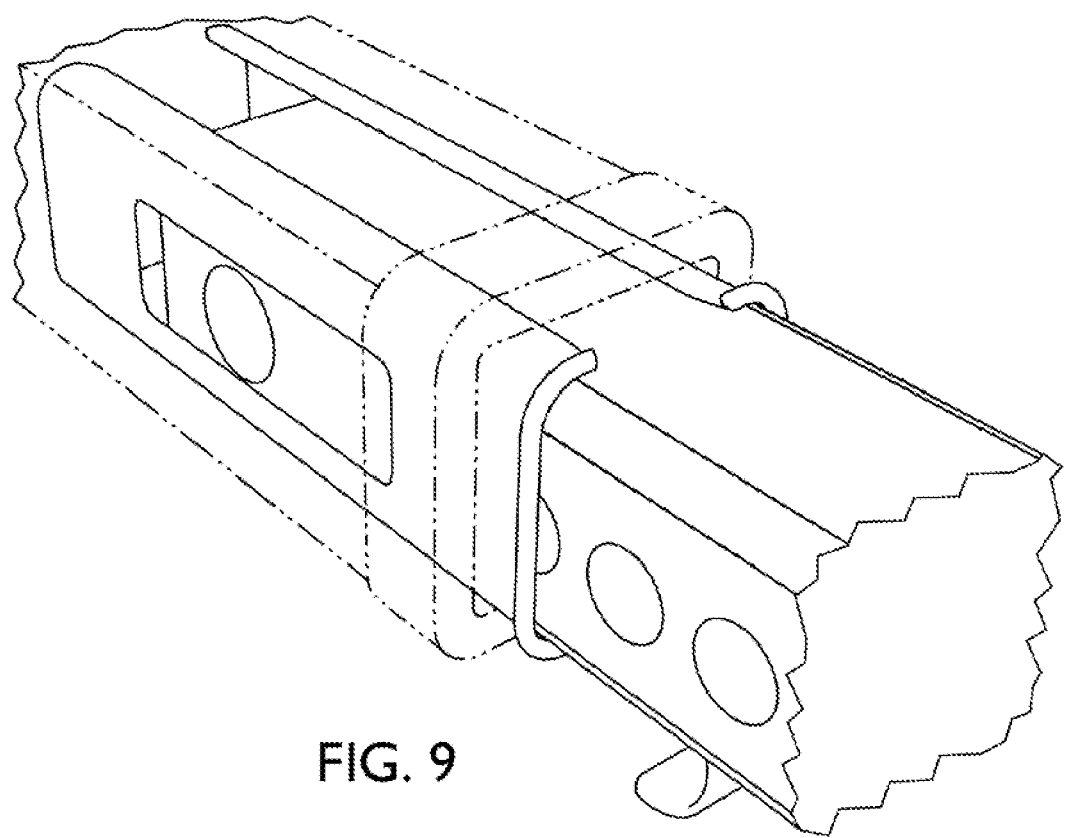
FIG. 9 depicts a representative bumper hitch receiver in phantom, with the invention of FIG. 1 inserted within, and with a representative bumper hitch insert inserted within the invention of FIG. 1.

For the sake of simplicity and to give the claims of this patent application the broadest interpretation and construction possible, the following definitions will apply:

The term "sleeve" or derivative thereof essentially means a longitudinal member able to fit snugly adjacent a cavity of a bumper hitch receiver.

The term "lockpin" essentially means a pin or similar member having a capability of being inserted through aligned holes in at least one side of a bumper hitch receiver and shank, and locked into a position as by a cotter pin through a bore near the leading tip of the lockpin.

The term "outstanding" or derivative thereof essentially means protruding away from a hypothetical longitudinal axis extending essentially through the chamber formed by the sleeve.

The term "rearward" or derivative thereof essentially means away from the front edge of the sleeve that leads the insertion into the receiver cavity.

Also for the sake of simplicity, the conjunctive "and" may also be taken to include the disjunctive "or," and vice versa, whenever necessary to give the claims herein the broadest interpretation and construction possible. Likewise, when the plural form is used, it may be taken to include the singular form, and vice versa.

The invention disclosed herein is not limited by construction materials to the extent that such materials satisfy the structural and/or functional requirements of any claim. For example, although sleeve material essentially comprises sheet metal, it may include any material capable of providing the necessary structural rigidity, surface hardness and resilient outward biasing from a compressed configuration toward a resting configuration. Such materials may include (for example) metals and alloys, polymers and plastics, and mixtures and combinations thereof.

In general, the invention disclosed herein includes (comprises) a sleeve having a longitudinal gap. The sleeve may preferably be resiliently flexible in its non-longitudinal dimension; in a resting configuration, the sleeve fits snugly into the cavity of the receiver, adjacent the cavity wall and resiliently bearing against it. The resilient flexibility allows the sleeve to temporarily flex inwardly during insertion into the receiver cavity, thereby easing insertion. Importantly, the resilient flexibility causes the sleeve to return toward its resting configuration once inserted into the receiver cavity. The inserted sleeve essentially pins itself against the inner wall of the receiver, thereby freeing up the user's bands during insertion of the shank into the sleeve.

The sleeve may further include a hard inner surface and a hard outer surface, enabling the sleeve to withstand being sandwiched between the receiver and the shank; otherwise, insertion of the shank into the already-inserted sleeve may cause gouging or depression of the sleeve, which may reduce its utility and lifespan. The sleeve may further include a trailing edge including an outstanding flange preventing complete insertion of the sleeve into the receiver. Typically the trailing edge may be rolled or bent outward away from the longitudinal axis of the sleeve; this may also add resilient flexibility to the sleeve, in the non-longitudinal direction. Alternatively, the trailing edge may include only a relatively small section or lip outstanding, preventing complete insertion of the sleeve into the receiver. To aid in inserting the sleeve into the receiver, and removing the sleeve from the receiver after use, the sleeve may further include a curl member outstanding rearward from the trailing edge. In one embodiment, the curl member is essentially a finger-curl allowing the user to use his or her finger (or common cylindrical items such as screwdrivers) to push the sleeve into the receiver during installation, and to pull it out during uninstallation.

One preferred embodiment of the invention comprises a longitudinal sleeve that has an essentially square cross-section, for snuggly fitting within a receiver cavity having a similarly-square cross-section. For example, four parallel creases may be applied longitudinally to a ribbon of sheet metal, such that the two creases nearest the middle of the ribbon will form a transition line from which the sheet metal will become a pair of side walls extending perpendicularly from the middle base wall between those two inner creases. The pair of creases nearest the opposite ends of the sheet metal ribbon likewise form similar respective corner lines, from which each respective terminal margin of the sheet metal ribbon extends essentially perpendicularly from the respective sidewall, toward the other respective terminal margin along essentially the same plane. The opposing ends of the sheet metal ribbon forming these longitudinal margins are separated by a longitudinal gap; the width of the gap narrows as the sidewalls are pushed together during insertion of the sleeve into the receiver cavity, then the width returns toward its resting dimension after the sidewalls are released and the flexible resilience causes the sleeve to return toward its resting configuration until contacting the inner wall of the receiver cavity.

In other words, the longitudinal sleeve has a longitudinal base wall (11), and an essentially parallel pair of sidewalls (12 and 13) upstanding essentially perpendicularly from a respective longitudinal transition line (14 and 15) of the base wall; these portions of the sleeve essentially resemble a squared U. At the top of both upright sidewalls are a pair of essentially co-planar upper longitudinal margins (16 and 17), each extending inwardly, essentially perpendicularly from a respective longitudinal corner line (18 and 19) of a respective sidewall and toward the other respective longitudinal margin, separated therefrom by a longitudinal gap (21); the sleeve further including a trailing edge including an outstanding lip preventing complete insertion of the sleeve into the receiver, and a curl member (22) outstanding rearward from the trailing edge. In one embodiment, the curl member is outstanding rearward from the base wall.

The outstanding lip may be the trailing edge of the sleeve, rolled outward into (or resembling) a flange (23). Alternatively, the outstanding lip may be a relatively small portion of the trailing edge, outstanding from the sleeve.

The sidewalls may define a pair of longitudinally oblong slots (24 and 25) aligned to allow impaling by a lockpin having its tip inserted through aligned bores in corresponding opposite sidewalls of both the receiver and the insert.

Besides the machine disclosed herein, the invention also includes a method of coupling pipes. In general, the method of using the device includes the steps of flexing the sleeve inward (in the non-longitudinal direction), inserting it into the receiver cavity, and inserting the shank into the sleeve. Other steps may include pushing the leading tip of a lockpin through aligned holes in the receiver, sleeve and shank, until that tip exits the other side of the receiver; a cotter pin may be inserted through a hole near the tip of the lockpin to prevent removal from the receiver.

Those skilled in the art who have the benefit of this disclosure will appreciate that it may be used as the creative basis for designing devices or methods similar to those disclosed herein, or to design improvements to the invention disclosed herein disclosed herein; such new or improved creations should be recognized as dependant upon the invention disclosed herein, to the extent of such reliance upon this disclosure.

I claim:

1. A device for insertion into the cavity of a bumper hitch receiver, between the receiver and a bumper hitch receiver shank, for reducing or eliminating wobbling of the shank, said device comprising a sleeve having a longitudinal gap, said sleeve further comprising a trailing edge including an outstanding flange preventing complete insertion of the sleeve into the receiver, and an assistance member extending from the trailing edge that accepts an essentially cylindrical item to assist in pushing or pulling the sleeve into or out of the receiver.

2. A device for insertion into the cavity of a bumper hitch receiver, between the receiver and a bumper hitch receiver shank, for reducing or eliminating wobbling of the shank, said device comprising a sleeve having a longitudinal gap, the sleeve further comprising a trailing edge including an outstanding lip preventing complete insertion of the sleeve into the receiver, and an assistance member extending frmo the trailing edge that accepts an essentially cylindrical item to assist in pushing or pulling the sleeve into or out of the receiver.

3. A sleeve described in claim 1 hereinabove, the sleeve further comprising a finger curl member outstanding rearward from the trailing edge.

4. A device for insertion into the cavity of a bumper hitch receiver, between the receiver and a bumper hitch receiver shank, for reducing or eliminating wobbling of the shank, said device comprising a longitudinal sleeve having a longitudinal base wall, an essentially parallel pair of sidewalls upstanding essentially perpendicularly from a respective longitudinal transition line of the base wall, and a pair of essentially co-planar upper longitudinal margins each extending inwardly, essentially perpendicularly from a respective longitudinal corner line of a respective sidewall and toward the other respective longitudinal margin, separated therefrom by a longitudinal gap; the sleeve further comprising a trailing edge including an outstanding lip preventing complete insertion of the sleeve into the receiver, and a curl member outstanding rearward from the trailing edge.

5. A sleeve described in claim 4 hereinabove, the curl member outstanding rearward from the base wall.

6. A sleeve described in claim 4, the outstanding lip comprising a rolled flange along the trailing edge of the sleeve.

7. A sleeve described in claim 4, the sidewalls defining a pair of longitudinally oblong slots aligned to allow impaling by a lockpin having its tip inserted through aligned bores in corresponding opposite sidewalls of both the receiver and the shank.

\* \* \* \* \*